US006997659B2

(12) United States Patent
Vrana et al.

(10) Patent No.: US 6,997,659 B2
(45) Date of Patent: Feb. 14, 2006

(54) SELF-ATTACHING FASTENER

(75) Inventors: John J. Vrana, Rochester Hills, MI (US); Richard P. Ward, Canton, MI (US); Harold A. Ladouceur, Livonia, MI (US)

(73) Assignee: Whitesell International Corporation, Taylor, MI (US)

( * ) Notice: Subject to any disclaimer, the term of this patent is extended or adjusted under 35 U.S.C. 154(b) by 0 days.

(21) Appl. No.: 10/811,658

(22) Filed: Mar. 29, 2004

(65) Prior Publication Data

US 2005/0214097 A1  Sep. 29, 2005

(51) Int. Cl.
*F16B 37/04* (2006.01)
(52) U.S. Cl. .................................. 411/179; 411/180
(58) Field of Classification Search ............... 411/85, 411/179–181, 427, 187; 29/525, 525.11, 29/432, 432.1
See application file for complete search history.

(56) References Cited

U.S. PATENT DOCUMENTS

| 2,944,642 | A | | 7/1960 | Evans |
| 3,089,360 | A | | 5/1963 | Steward |
| 3,091,843 | A | | 6/1963 | Double et al. |
| 3,152,628 | A | | 10/1964 | Strain et al. |
| 3,213,914 | A | | 10/1965 | Baumle et al. |
| 3,253,631 | A | | 5/1966 | Reusser |
| 3,282,315 | A | * | 11/1966 | Zahodiakin ................. 411/179 |
| 3,299,500 | A | | 1/1967 | Double |
| 3,648,747 | A | | 3/1972 | Steward |
| 3,724,520 | A | | 4/1973 | Ladouceur et al. |
| 3,810,291 | A | * | 5/1974 | Ladouceur ............. 29/243.517 |
| 3,926,236 | A | * | 12/1975 | Pouch et al. ................. 411/179 |
| 4,119,827 | A | | 10/1978 | Lenox |
| 4,484,385 | A | | 11/1984 | Woods |
| 4,971,499 | A | | 11/1990 | Ladouceur |
| 5,502,888 | A | * | 4/1996 | Takahashi et al. ............. 29/798 |
| 5,549,430 | A | * | 8/1996 | Takahashi et al. ........... 411/179 |
| 5,882,159 | A | * | 3/1999 | Muller ................... 411/180 X |
| 6,125,524 | A | * | 10/2000 | Mueller ....................... 29/520 |
| 6,276,040 | B1 | * | 8/2001 | Muller ................... 411/180 X |
| 2003/0039530 | A1 | | 2/2003 | Ross et al. |
| 2004/0086355 | A1 | * | 5/2004 | Couillais et al. ............. 411/181 |
| 2004/0202524 | A1 | * | 10/2004 | Ross et al. ................. 411/181 |
| 2005/0013679 | A1 | * | 1/2005 | Ladoucer et al. ........... 411/180 |

FOREIGN PATENT DOCUMENTS

EP  0 561 715 A1  9/1993

* cited by examiner

*Primary Examiner*—Katherine Mitchell
(74) *Attorney, Agent, or Firm*—Howard & Howard

(57) ABSTRACT

The self-attaching female fastener of this invention includes a re-entrant groove having a V-shaped bottom wall including relatively inclined bottom faces of equal width having an arcuate apex centered beneath the restricted opening to the groove. A die drives a panel portion through the restricted groove opening against the bottom faces, driving the panel portion into the apex and inwardly beneath the inclined inner side wall and outwardly beneath the inclined outer side wall of the groove, resulting in a better installation and accommodating a wider range of panel thicknesses. The V-shaped bottom wall also centers and balances the rolls during the rolling process resulting in a more accurate cross-section of the fastener.

13 Claims, 5 Drawing Sheets

SELF-ATTACHING FASTENER

FIELD OF THE INVENTION

This invention relates to self-attaching female fasteners, including pierce and clinch nuts, and the method of installing such self-attaching fasteners in a metal panel.

BACKGROUND OF THE INVENTION

Pierce and clinch nuts were first invented by the predecessor in interest of the assignee of this application over 50 years ago as shown, for example, by U.S. Pat. Nos. 3,089,360, 3,091,843 and 3,152,628. As shown in such patents, the original pierce and clinch nuts were T-shaped in cross-section having a projecting pilot portion and integral flange portions on opposed sides of the pilot portion. Where the fastener is utilized as a pierce nut, the end face of the pilot portion is driven against a panel supported on a die member or die button and the pilot portion pierces an opening in the panel and the panel is secured to the nut by the die member as disclosed, for example, in the above-referenced U.S. Pat. No. 3,089,360. Alternatively, the fastener may be utilized as a clinch nut, wherein an opening is preformed through the panel configured to receive the pilot portion and the panel is then secured to the fastener by the die button either by deforming the projecting end of the pilot portion or by deforming the panel into grooves in the pilot portion. As used herein, the term "self-attaching female fastener," includes both clinch and pierce nuts.

Various improvements to self-attaching female fasteners have been made by the predecessor in interest of the assignee of this application primarily to improve the push-off strength or retention of the fastener to the panel as disclosed, for example, in U.S. Pat. Nos. 3,648,747 and 4,971,499. The self-attaching female fasteners disclosed in these patents include a central pilot portion, flange portions on opposed sides of the pilot portion each having a planar bearing face as described above; however, the panel bearing faces each include a "re-entrant groove" which provide significantly improved push-off strength when installed in a metal panel. As used herein, the term "re-entrant groove" includes opposed inclined side walls and a bottom wall, wherein the inner side wall is inclined outwardly from the bottom wall toward the outer side wall and the outer side wall is inclined inwardly toward the inner side wall forming a restricted opening to the grooves, wherein the width of the grooves adjacent the panel bearing or support faces of the flange portions are less than the width of the grooves adjacent the bottom wall. As disclosed in these patents, the bottom wall is flat and parallel to the panel support faces of the flange portions.

The method of installing the self-attaching female fasteners disclosed in these patents is similar to the method of installing the T-shaped self-attaching fasteners described above. That is, a metal panel is supported on a die button having projecting clinching lips and the pilot portion is driven through an opening in the panel and the projecting lips or "clinching lips" of the die button are driven against the panel, wherein the clinching lips deform panel portions adjacent the panel opining into the grooves and against the bottom wall. Where the self-attaching nut is used as a pierce nut, the pilot portion pierces a slug from the panel, forming the opening through the panel as described above. However, in this embodiment, the end faces of the clinching nuts deform panel portions adjacent the panel opening against the bottom wall of the groove deforming the panel portions inwardly against and beneath the inclined inner side wall of the grooves and outwardly against and beneath the inclined outer side wall of the grooves forming a more secure installation having greater push-off strength.

In a typical application of a self-attaching female fastener of the types described above, the self-attaching female fasteners are fed to an installation head having a reciprocal plunger generally attached to the upper die shoe of a die press and the die button is installed in the lower die shoe of the die press. A panel is received on the die button and, upon closing of the die press, the plunger drives the fastener through a plunger passage into the panel to install the self-attaching female fastener in the panel as described above. The panel may be simultaneously formed in the die press and the die press may include multiple installation heads and die buttons to simultaneously install a plurality of self-attaching female fasteners in the panel. Various means are utilized to feed the self-attaching female fasteners to the installation head. For example, the self-attaching female fasteners may be fed to the installation head in bulk or the fasteners may be interconnected by frangible connector elements in a continuous strip of fasteners, wherein the plunger simultaneously shears a fastener located in the plunger passage from the fastener strip and installs the fastener in a panel as described in U.S. Pat. No. 3,845,860, also assigned to the predecessor in interest of the assignee of this application. In a preferred embodiment, the frangible connector elements are frangible wires, which may be formed of any suitable frangible material, which are installed in linear grooves on the back face of the fasteners on opposed sides of the fastener bore, preferably aligned with the fastener grooves as also disclosed in the above-referenced U.S. Pat. No. 4,971,499.

As will be understood by those skilled in this art, the self-attaching female fasteners described above may be formed in a rolling mill, wherein the desired cross-sectional shape of the self-attaching female fastener is rolled from a steel wire, the bores are punched or pierced through the pilot portion, the fasteners are cut to length and the bore may then be tapped or internally threaded. However, it is difficult to accurately roll the desired shape of the re-entrant groove because the fastener strip must be very accurately located relative to the forming rolls and it is presently not possible to balance the rolling forces in a conventional self-attaching nut configuration. Where the self-attaching fasteners are to be interconnected by frangible connector elements in a strip form, as described above, the wire grooves are rolled into the back face of the strip during roll forming of the fasteners and wires are then inserted into the grooves and secured.

As will also be understood by those skilled in this art, one limitation upon applications for self-attaching female fasteners of the type described is panel thickness. That is, the self-attaching female fasteners described above have a limited range of panel thicknesses which will provide a good installation. Further, although the self-attaching female fasteners having a re-entrant groove described above provide excellent push-off strength, further improvements can be made, particularly for heavy metal applications. It is also desirable to pack, but not to completely fill the re-entrant grooves with panel metal to avoid damage to the clinching lips of the die button and not cause thread closure.

Various attempts have been made by the predecessor in interest of the assignee of this application and others to improve the integrity of the joint formed between the fastener and the panel by modifying the shape of the grooves which receive the panel during installation of the fastener, beginning with U.S. Pat. Nos. 3,299,500 and 3,724,520, both assigned to the assignee of the predecessor in interest of the assignee of this application U.S. Pat. Nos. 3,213,914, 3,253,631 and 4,119,827 also disclose various embodiments of self-attaching fasteners having grooves configured to provide improved retention or prevent rotation of the fastener relative to the panel following installation. The above-referenced U.S. Pat. Nos. 3,299,500 and 2,944,642 do disclose panel receiving grooves having a generally V-shaped bottom wall; however, the grooves are not re-entrant grooves and the method of installing a self-attaching fastener disclosed in U.S. Pat. No. 3,299,500 requires deformation of the pilot portion during installation to achieve sufficient push-off strength.

There is, therefore, a continuing need for improvements in self-attaching female fasteners which are easier to form and which provide improved push-off strength, particularly in thick or heavy metal panel applications. These objects are achieved with the self-attaching female fastener and method of installation of this invention.

SUMMARY OF THE INVENTION

As set forth above, this invention relates to a self-attaching female fastener for attachment to a metal panel and a method of attaching a self-attaching female fastener to a metal panel which is easier to form and which results in improved retention of the female fastener to the panel, particularly in heavy metal panels. The self-attaching female fastener of this invention includes a central pilot portion having an end face and a bore extending through the end face through the pilot portion. The female fastener further includes a flange portion on at least opposed sides of the pilot portion having a generally planar panel support face, preferably generally parallel to the end face of the pilot portion. Finally, the self-attaching female fastener of this invention includes a re-entrant groove having a V-shaped bottom wall. More specifically, the female fastener includes a groove in the panel support face of the flange portion adjacent the pilot portion including an inclined inner side wall defining an outer face of the pilot portion, an inclined outer side wall and a V-shaped bottom wall, wherein the inner side wall is inclined outwardly from the bottom wall toward the flange portion and the outer side wall is inclined inwardly from the bottom wall toward the pilot portion forming a groove opening adjacent the panel support face of the flange portion having a width less than a width of the bottom wall. In a preferred embodiment of the female fastener of this invention, the V-shaped bottom wall includes two generally opposed relatively inclined bottom faces generally equal in width which define the sides of an equilateral triangle having an apex extending away from a plane of the panel support face, generally equally spaced between the inner and outer side walls of the groove.

In a preferred embodiment of the self-attaching female fastener of this invention, the apex of the bottom faces of the V-shaped bottom wall is arcuate, preferably having a radius between 0.010 to 0.040 inches or preferably between 0.025 and 0.035 inches. Further, the bottom faces of the V-shaped groove are inclined relative to the generally planar panel support face at an angle between 15 and 25 degrees, more preferably between 15 and 20 degrees, such that panel metal deformed against the bottom wall is deformed inwardly against and beneath the inclined inner side wall and outwardly against and beneath the inclined outer side wall of the groove, forming a secure mechanical interlock between the panel and the groove. The intersections between the V-shaped bottom wall and the inner and outer side walls are also preferably arcuate and the inclined outer side wall of the groove preferably joins the panel support face of the flange portion in an arcuate surface. The inclined inner side wall of the groove in a preferred embodiment also joins the end face of the pilot portion in an arcuate wall; however, the inner side wall of the groove preferably includes a planar surface at the upper extent of the inner side wall, particularly where the end face of the pilot portion is spaced above the panel support face of the flange portion.

As set forth above, the self-attaching female fastener of this invention may be cold rolled from a steel wire, forming the desired cross-section of the female fastener. The fastener strip is then pierced to form the bore and cut to length, wherein the flange portion is rectangular. Where the pilot portion is formed during the rolling process rather than separately formed, the pilot portion is also rectangular. However, the pilot portion may also be separately formed, wherein the pilot portion may have any convenient shape, including round. Where the female fasteners are to be interconnected by a frangible connector element or elements, as described above, a generally semi-circular groove is simultaneously rolled into the back face of the fastener blank, which may be aligned with the apex of the bottom faces of the V-shaped bottom wall of the groove. In this embodiment, the V-shaped bottom wall of the groove provides an important advantage during the rolling process, accurately locating the fastener strip during the final rolling processes and balancing the rolling forces. In one preferred embodiment of the self-attaching female fastener of this invention, the bore is internally threaded or tapped following piercing of the bore in the fastener strip, and cutting the strip to length, although the bore may be cylindrical to receive a self-tapping or thread rolling male fastener. Where the bore is tapped, one preferred embodiment of the self-attaching female fastener of this invention includes a recess in the back face of the female fastener surrounding the bore which avoids problems associated with burrs from the tapping operation interfering with feeding fasteners through the installation head and installing the fasteners in a panel as described below.

Where the self-attaching female fastener of this invention is formed by rolling a wire groove or grooves, as described above, a preferred embodiment of the self-attaching female fastener includes a rectangular flange portion having generally planar panel support faces on opposed sides of the central pilot portion and linear grooves in the panel support faces on opposed sides of the pilot portion, wherein the linear grooves are "re-entrant grooves," as described above, each having inclined inner and outer side walls and a V-shaped bottom wall. However, the self-attaching female fastener of this invention may also be formed by cold-forming techniques, including a progressive die, wherein the re-entrant groove may be annular, surrounding the pilot portion and the V-shaped bottom wall of the annular groove includes a plurality of circumferentially spaced radial anti-rotation elements as is known in this art.

The method of attaching a self-attaching female fastener to a metal panel of this invention then includes locating a metal panel opposite a die member including a projecting lip having an end face, locating a self-attaching female fastener as described above opposite the metal panel with the groove in the end face of the flange portion aligned with the projecting lip of the die member, then driving the pilot portion of the self-attaching fastener through an opening in the panel and driving the end face of the projecting lip of the die member against the metal panel, deforming a portion of the metal panel adjacent the panel opening into the groove and against the V-shaped bottom wall of the groove, deforming the panel portion inwardly against and beneath the inclined inner side wall of the groove and outwardly against and beneath the inclined outer side wall of the groove, forming a secure mechanical interlock between the panel portion and the self-attaching female fastener.

In one preferred embodiment of the method of this invention, the end face of the projecting lip of the die member deforms a portion of the metal panel into the groove and against the V-shaped bottom wall of the groove adjacent the apex of the bottom faces, preferably adjacent to the apex, but closer to the inclined inner side wall of the groove. The end face of the projecting lip of the die member then drives the panel portion into the apex of the bottom faces of the V-shaped bottom wall of the groove, deforming the panel portion outwardly against and beneath the inclined outer wall of the groove and inwardly against and beneath the inner inclined side wall of the groove. In one disclosed embodiment, the end face of the projecting lip of the die member is planar and generally parallel to the panel support face of the flange portion, which may be preferred for thicker panels. In another disclosed embodiment, the end face is V-shaped having an apex aligned with the apex of the bottom faces of the V-shaped groove, wherein the end face of the projecting lip adjacent the pilot portion is preferably longer than the opposed relatively inclined end face to align the apex of the end faces of the projecting lip of the die member with the apex of the bottom faces of the groove. In both embodiments, the die member includes a bore having a surface adjacent the pilot portion extending perpendicular to the end face of the pilot portion and an inclined outer face which deforms the panel portion outwardly beneath the inclined outer side wall of the groove. As will be understood, where the self-attaching female fastener includes parallel linear grooves, as described above, the die member includes spaced parallel projecting lips, each lip having an end face as described above aligned with the grooves in the rectangular self-attaching female fastener. However, as described above, the self-attaching female fastener of this invention may also be cold formed, wherein the female fastener may be generally round having an annular groove in the panel support face of the flange portion, wherein the projecting lip of the die member is also annular and configured to be received in the annular groove.

Other advantages and meritorious features of the self-attaching female fastener and method of installation of this invention will be more fully understood from the following description of the preferred embodiments, the appended claims and the drawings, a brief description of which follows. However, as will be understood by those skilled in this art, the embodiments disclosed in the drawings and described below are for illustrative purposes only and do not limit this invention except as set forth in the appended claims.

DESCRIPTION OF THE PREFERRED EMBODIMENTS

As set forth above and described further hereinbelow, the self-attaching female fastener of this invention may be utilized either as a pierce of clinch nut, wherein the female fastener includes a bore and the female fastener may be permanently installed in a metal panel in a die press for attachment of a second member to the metal panel by threading a male fastener into the bore of the female fastener to secure the second member to the panel as described in the above-referenced patents.

Figure 1:
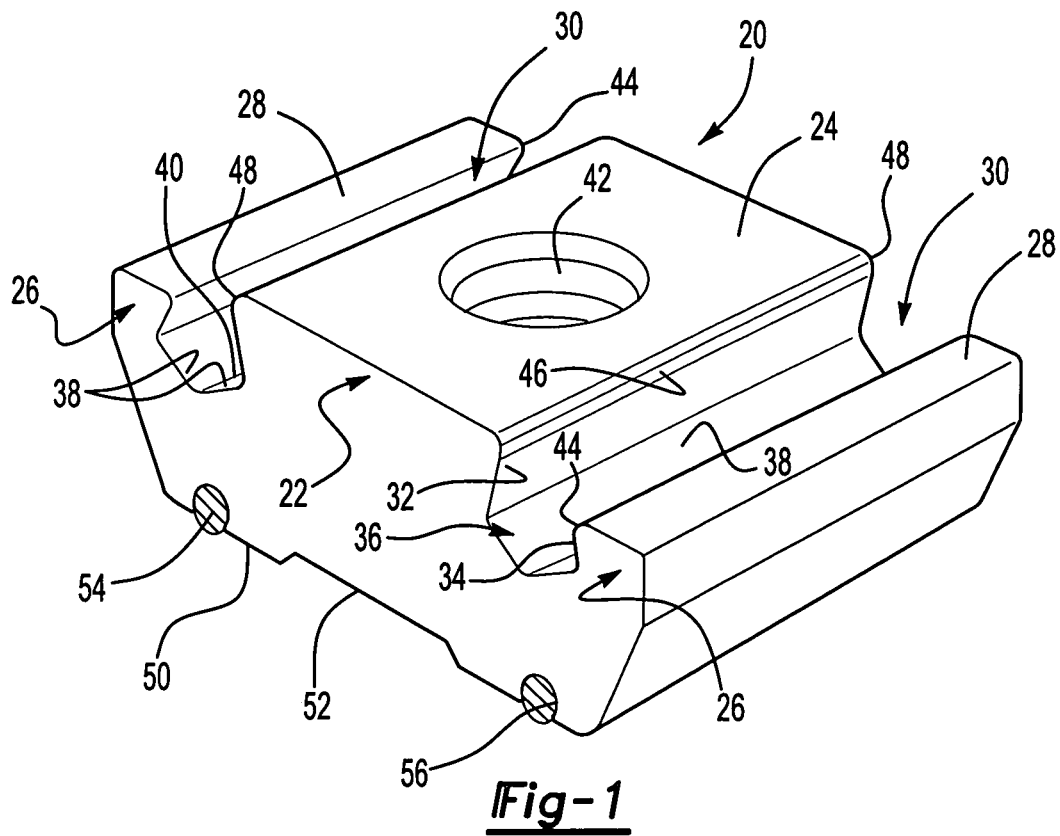
FIG. 1 is an end perspective view of one embodiment of a self-attaching fastener of this invention.
Figure 2:
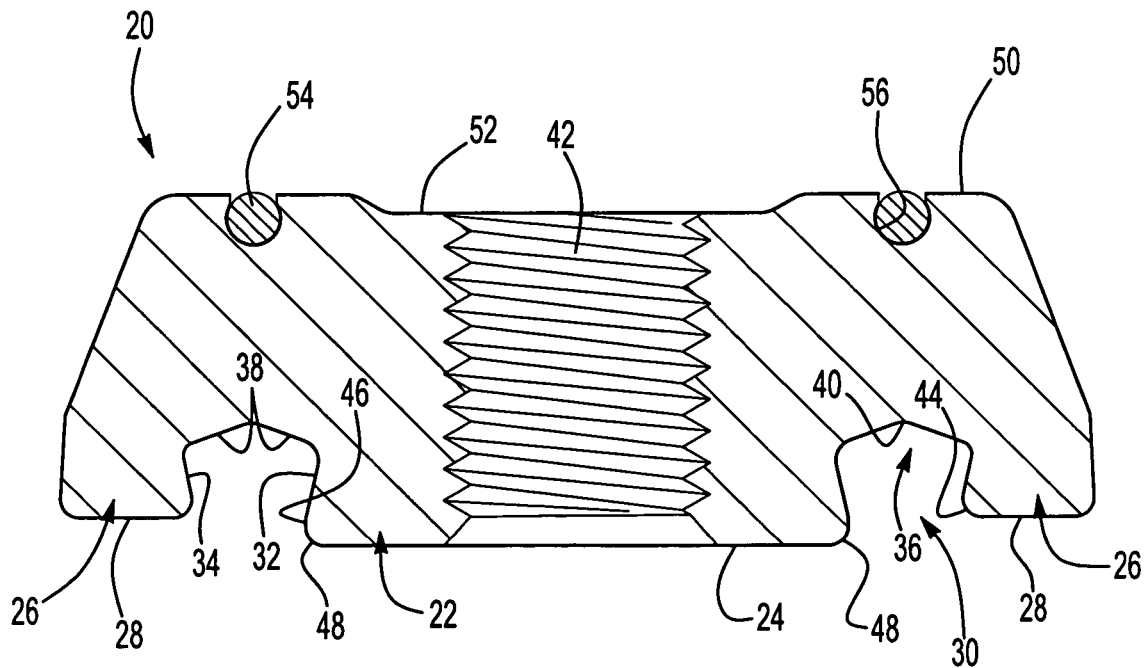
FIG. 2 is a side cross-sectional view of the embodiment of the self-attaching female fastener shown in FIG. 1, with the fastener turned 180 degrees.

As best shown in FIGS. 1 and 2, the disclosed embodiment of the self-attaching female fastener 20 includes a central pilot portion 22 having an end face 24 and flange portions 26 on opposed sides of the pilot portion 22 each having a generally planar support face 28. The disclosed embodiment of the self-attaching female fastener 20 further includes parallel linear re-entrant grooves 30 defined in the panel support faces 28 of the flange portion 26 adjacent the pilot portion 22. The reentrant grooves 30 each include an inclined inner side wall 32, which also defines the outer face of the pilot portion 22, an inclined outer side wall 34 and a V-shaped bottom wall 36 having relatively inclined bottom faces 38 intersecting at an apex 40, such that the apex extends away or is spaced further from the panel support faces 28 of the flange portions 26. In one preferred embodiment, the pilot portion 22 includes a threaded bore 42 which extends through the end face 24 through the pilot portion 22 as best shown in FIG. 2. Alternatively, the bore 42 may be unthreaded to threadably receive a self-tapping or thread rolling male fastener.

In the disclosed embodiment of the self-attaching female fastener 20, the end face 24 is spaced above the panel support faces 28 of the flange portions 26 and the panel support faces 28 are preferably planar. However, the panel support faces 28 of the flange portions 26 may also be aligned with the end face 24 of the pilot portion 22.

As best shown in FIG. 2, the outer side wall 34 of the grooves 30 is inclined from the V-shaped bottom wall 30 toward the pilot portion to the panel support face 28 of the flange portion 26 and joins the end face 28 in a radius 44. The inclined inner side wall 32 is inclined from the V-shaped bottom wall 36 toward the flange portion 26, but in the disclosed embodiment, the inner side wall of the grooves 30 include a flat surface 46 which joins the end face 24 of the pilot portion 22 in a radius 48 as best shown in FIG. 2. In a preferred embodiment of the self-attaching female fastener 20 of this invention, the bottom faces 38 of the V-shaped bottom wall 36 are equal in width, such that the apex 40 is spaced equally between the inner and outer side walls 32 and 34 respectively and the apex 40 is preferably arcuate having a radius greater than 0.01 inches or between 0.01 and 0.05 inches, or preferably between 0.025 and 0.035 inches. Further, the bottom faces 38 of the V-shaped bottom wall 36 are preferably at an obtuse angle relative to the inner and outer side walls 32 and 34 or an acute angle relative to the end faces 28 of the flange portions 26, preferably at an angle of between 15 and 25 degrees, more preferably between 15 and 20 degrees, which provides superior push-off strength when installed in a relatively thick panel as discussed further below.

Where the bore 42 through the pilot portion 22 is threaded as shown in FIGS. 1 and 2, the back face 50 of the self-attaching female fastener 20 includes a recess 52 surrounding the bore 42 to prevent tapping burrs from interfering with the feeding and installation of the fastener in an installation head. Alternatively, the end of the threaded bore 42 adjacent the end face 24 may include a chamfer. Where the fasteners are interconnected in a strip by frangible connector elements, such as frangible wires 54, as described in the above-referenced U.S. Pat. No. 3,845,860, semi-circular grooves 56 may be rolled into the back face 50 of the self-attaching fastener during the roll forming process. As best shown in FIG. 2, the grooves 56 are preferably aligned with the apex 40 of the bottom faces 38 of the V-shaped grooves 36, wherein the V-shaped grooves 36 more accurately align the fastener strip during the rolling process than conventional re-entrant grooves having a flat bottom wall, resulting in more accurate manufacture of self-attaching fasteners of this type. The V-shaped bottom wall 36 also results in improved retention or push-off strength of the fastener and panel assembly, particularly in thicker metal panels, as described below with regard to the method of installation.

Figure 3:
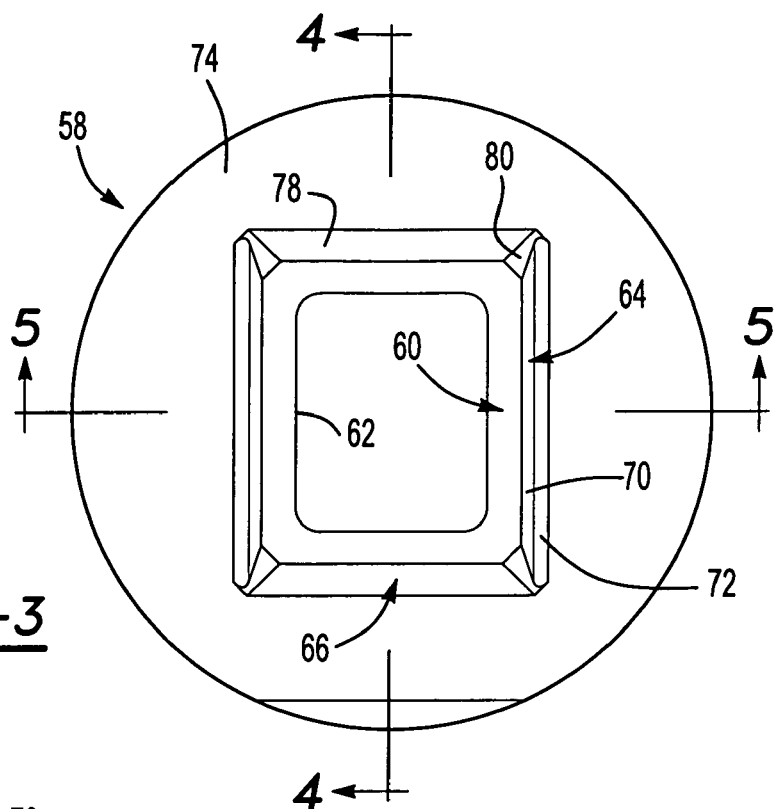
FIG. 3 is a top view of one embodiment of a die button which may be utilized in the method of attaching the female of this invention to a panel.
Figure 4:
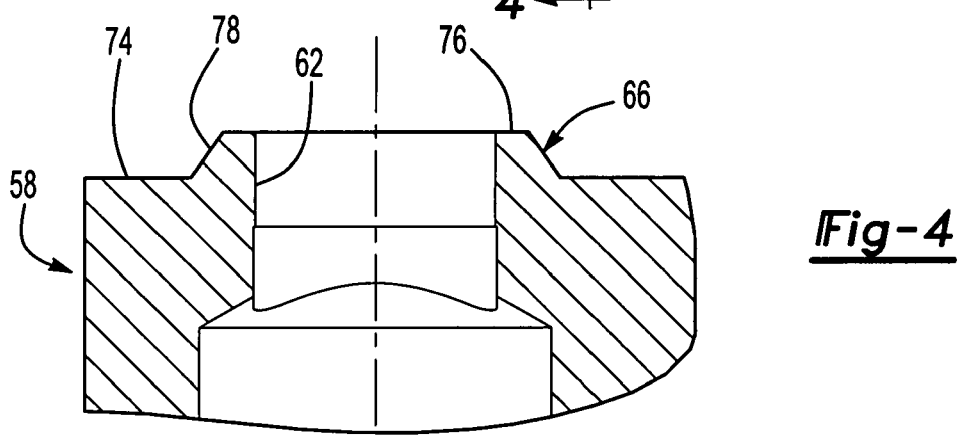
FIG. 4 is a side cross-sectional view of FIG. 3 in the direction of view arrows 4—4.
Figure 5:
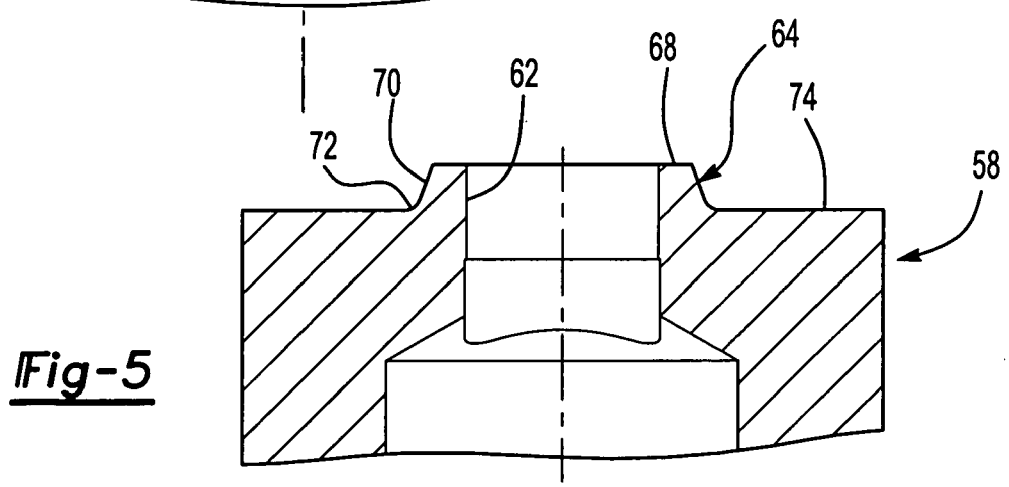
FIG. 5 is a side cross-sectional view of FIG. 3 in the direction of view arrows 5—5.

FIGS. 3 to 5 illustrate one suitable embodiment of a die member or die button 58 for installing the self-attaching female fastener 20 shown in FIGS. 1 and 2. The disclosed embodiment of the die button 58 includes a projecting lip 60 surrounding an opening 62 which extends through the die button as shown in FIGS. 4 and 5. Because the pilot portion 22 in the disclosed embodiment of the self-attaching female fastener 20 is rectangular, the projecting lip 60 is also rectangular, including spaced parallel clinching lips 64, which drive the panel metal into the reentrant grooves 30 of the self-attaching female fastener 20, as described below, and transverse spaced parallel spanking or non-clinching lips 66 on opposed sides of the opening 62. As shown in FIG. 3, the clinching lips 64 are longer than the spanking or non-clinching lips 66 such that the opening 62 is configured to receive the rectangular pilot portion 22 of the self-attaching female fastener 20 as described below. Each of the clinching lips 64 include an end face 68, which in the disclosed embodiment is perpendicular to the walls of the opening 62, an inclined outer side face 70 and an arcuate surface 72 where the inclined outer side face 70 joins the planar end face 74 of the die button 58 as best shown in FIG. 5. In the disclosed embodiment, the spanking or non-clinching lips 66 also include an end face 76 which extends perpendicular to the inner wall of the opening 62 each having an inclined outer side face 78 as best shown in FIG. 4. As will be understood by those skilled in this art, deformed panel metal adjacent the opening formed in the panel adjacent the pilot portion across the short side of the pilot portion 22 flush with the panel metal in the grooves, but form no part of this invention. Typically, the corners 80 of the projecting lips 60 are chamfered as shown in FIG. 3. The following figures illustrate the method of installing the self-attaching female fastener 20 of this invention and the function of the clinching lips 64.

Figure 6:
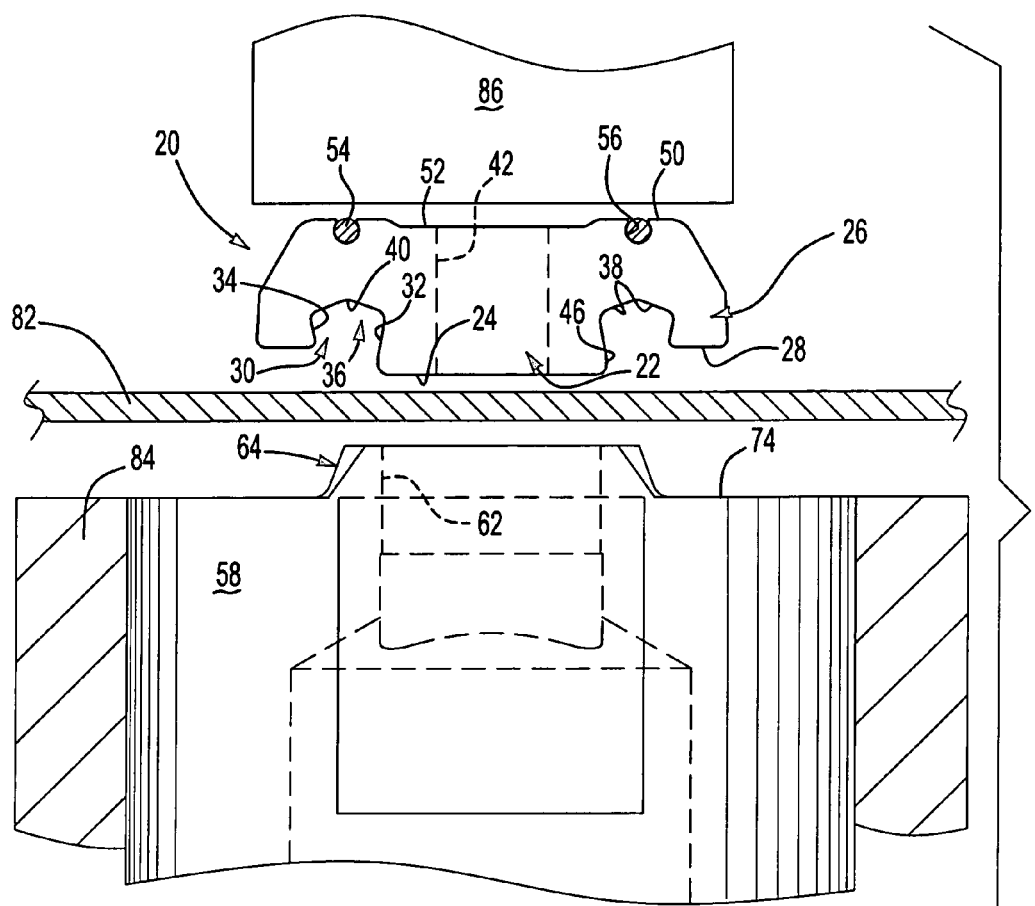
FIG. 6 is a side view of the self-attaching female fastener shown in FIG. 1 with the die button shown in FIGS. 3 to 5 aligned in an installation apparatus, ready for installation in a metal panel.
Figure 7:
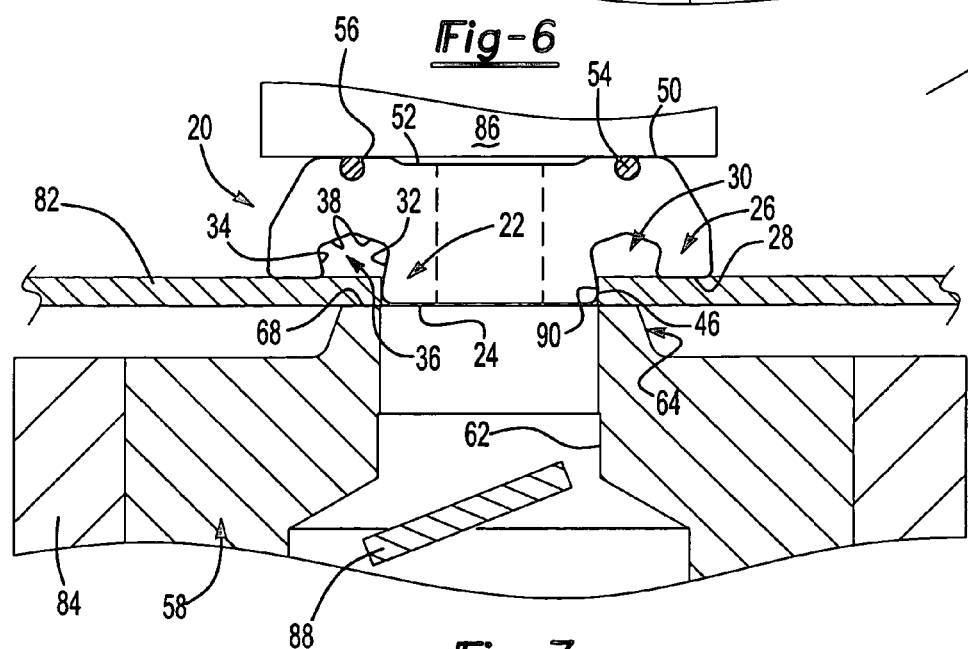
FIG. 7 is a side partially cross-sectioned view of FIG. 6 during installation of the self-attaching female fastener in a panel, wherein the female fastener is utilized as a pierce nut.
Figure 8:
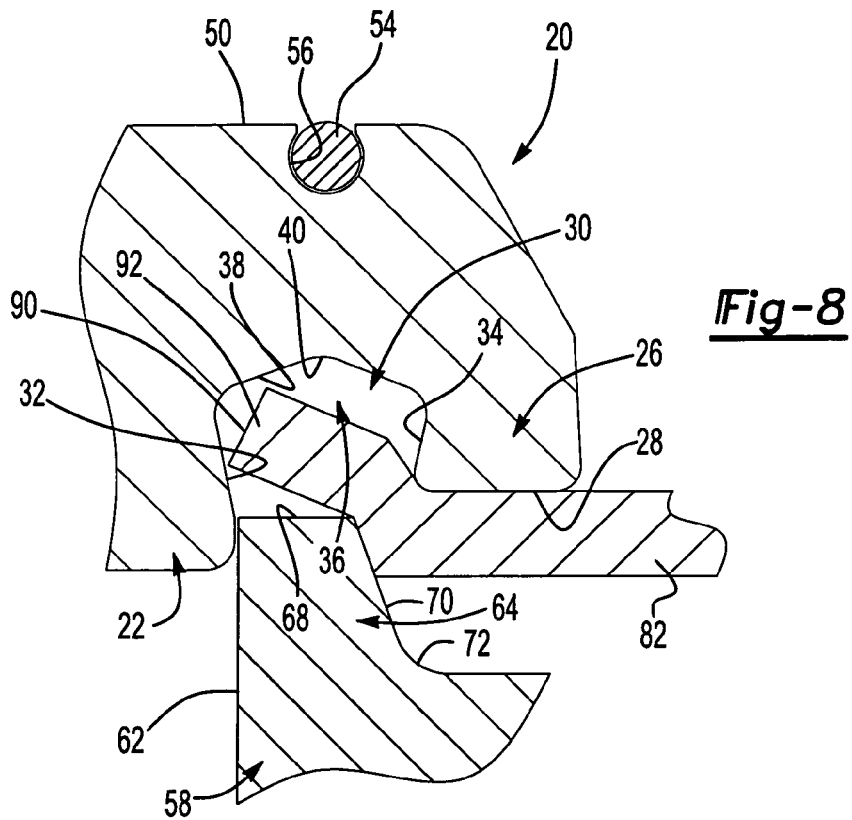
FIG. 8 is a partial side cross-sectional view of FIGS. 6 and 7 during installation of the illustrated female fastener in a metal panel.
Figure 9:
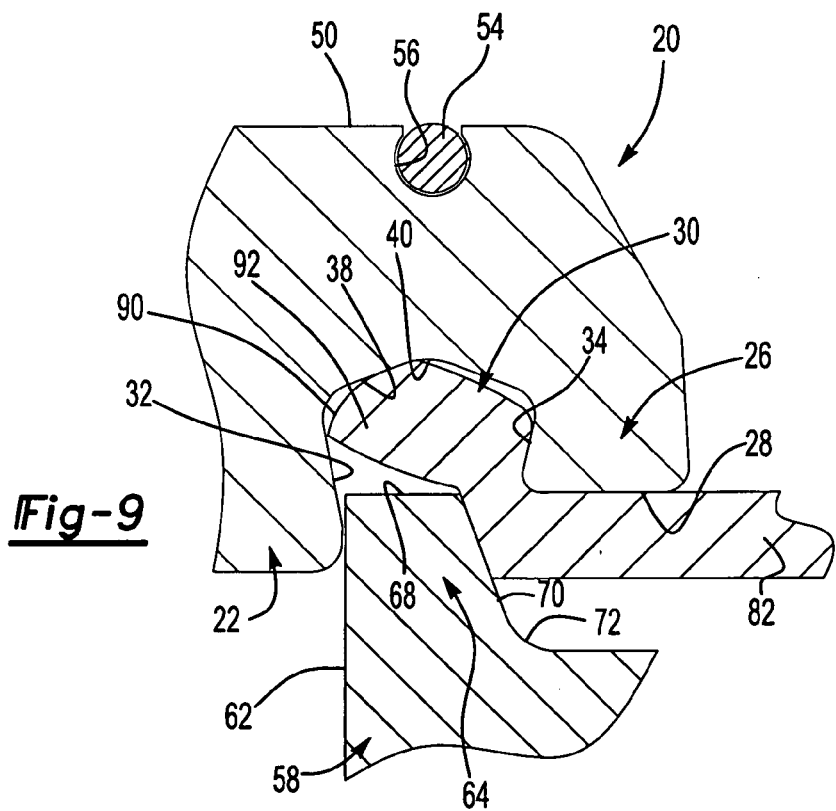
FIG. 9 is a partial side cross-sectional view similar to FIG. 8 as the self-attaching female fastener is installed in a panel.
Figure 10:
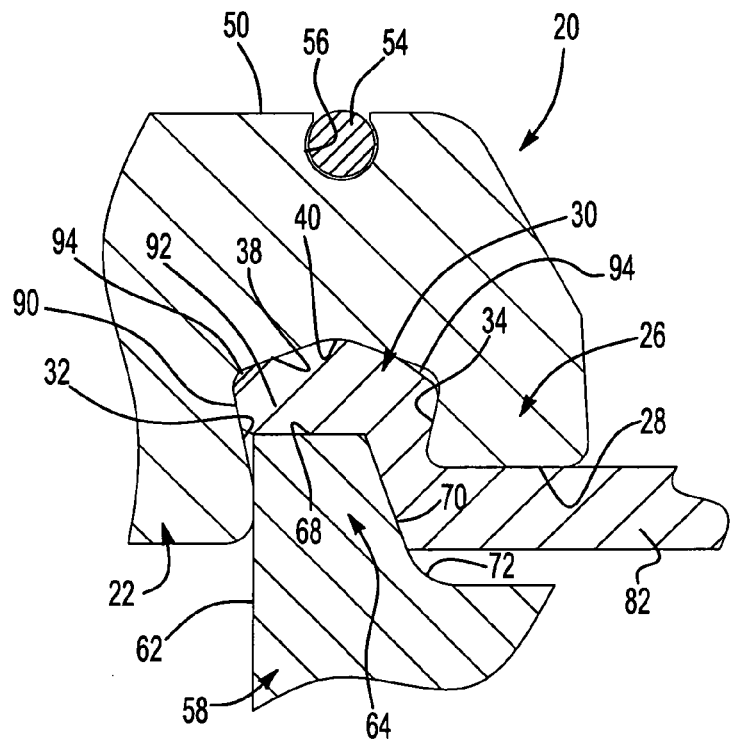
FIG. 10 is a side cross-sectional view as shown in FIGS. 8 and 9 following installation of the female fastener in a panel.

FIG. 6 illustrates the orientation of the self-attaching female fastener 20 with the die button 58 and a metal panel 82. In a typical application as described above, the die button 58 is located in the lower die shoe 84 of a die press (not shown) and self-attaching female fasteners 20 are fed to and received in an installation head (not shown) in the upper die shoe (not shown) having a reciprocal plunger 86 as described further in the above-referenced patents assigned to the predecessor in interest of the assignee of this application. Typically, the panel 82 is fixed relative to the lower die shoe 84 and the plunger 86 is driven against the back face 50 through a plunger passage of the fastener installation head (not shown). However, FIG. 6 is an exploded view to better illustrate the alignment of the self-attaching fastener 20 with the die button 58, wherein the pilot 22 is aligned with the opening 62 through the die button 58 and the clinching lips 64 are aligned with the reentrant grooves 30, which is the initial step of the method of installing a self-attaching female fastener 20 in a panel 82 of this invention.

Where the self-attaching female fastener 20 is utilized as a self-piercing fastener or pierce nut, the end face 24 of the pilot portion 22 is driven against the panel 82 and a slug 88 is pierced from the panel 82 by the cooperation of the end face 24 of the pilot portion 22 and the end faces 68 and 76 of the clinching lips 64 and spanking lips 66 respectively as shown in FIG. 7. As will be understood, the opening 90 formed in the panel 82 will therefore be configured to receive the pilot portion 22 therethrough. Where the self-attaching female fasteners 20 are interconnected by frangible wires 54, the plunger 86 will shear the frangible connector elements as the plunger is driven against the female fastener in the plunger passage of the installation head (not shown). The clinching lips 64 are also aligned with the re-entrant grooves 30 as shown in FIG. 7. Alternatively, where the self-attaching fastener 20 is utilized as a self-clinching fastener, the opening 90 through the panel 82 is preformed and configured to receive the pilot portion 22. FIGS. 8 to 10 illustrate the sequence of installation of the self-attaching female fastener 20 in the panel 82 as the clinching lips 64 are driven against the panel 82 into the re-entrant grooves 30 as now described.

As shown in FIG. 8, as the clinching lips 64 are driven into the re-entrant grooves 30, a portion 92 of the panel 82 adjacent the panel opening 90 is driven into the re-entrant grooves 30 and the panel portion 92 is then driven against the inclined outer wall of the clinching lips 64. The panel support faces 28 of the flange portions 26 are then bottomed against the panel 82. Continued driving of the clinching lips 64 into the re-entrant grooves 30 deforms the panel portion 92 against the bottom face 38 of the re-entrant groove adjacent to, but spaced from the apex 40 of the bottom faces 38. As best shown in FIG. 9, the panel portion 92 is initially driven against the bottom face 38 adjacent to the inclined inner side wall 32 of the reentrant groves 30 as the panel portion 92 is driven against the bottom faces 38. The panel portion 92 adjacent the opening 90 is then driven into the apex 40 of the relatively inclined bottom faces 38, deforming the panel portion 92 inwardly against and beneath the inclined inner side wall 32 of the re-entrant grooves 30 and outwardly against and beneath the inclined outer side wall 34 as shown in FIG. 10. In a preferred embodiment of the method of installing a self-attaching female fastener 20 of this invention, however, slight gaps 94 remain unfilled. That is, the panel portion 92 does not fully pack the re-entrant grooves 30, avoiding damage to the clinching lips 64 or distortion of the thread cylinder 42. The V-shaped bottom wall 36 (see FIG. 2) thus serves a second important function in the method of installing the self-attaching female fastener of this invention. The relatively inclined bottom faces 38 guide the panel portion 92 to substantially but not completely fill the re-entrant grooves 30, deforming and guiding the panel metal 92 inwardly and outwardly to substantially fill the re-entrant grooves and provide a more secure installation, particularly in relatively heavy panels as discussed further hereinbelow.

Figure 11:
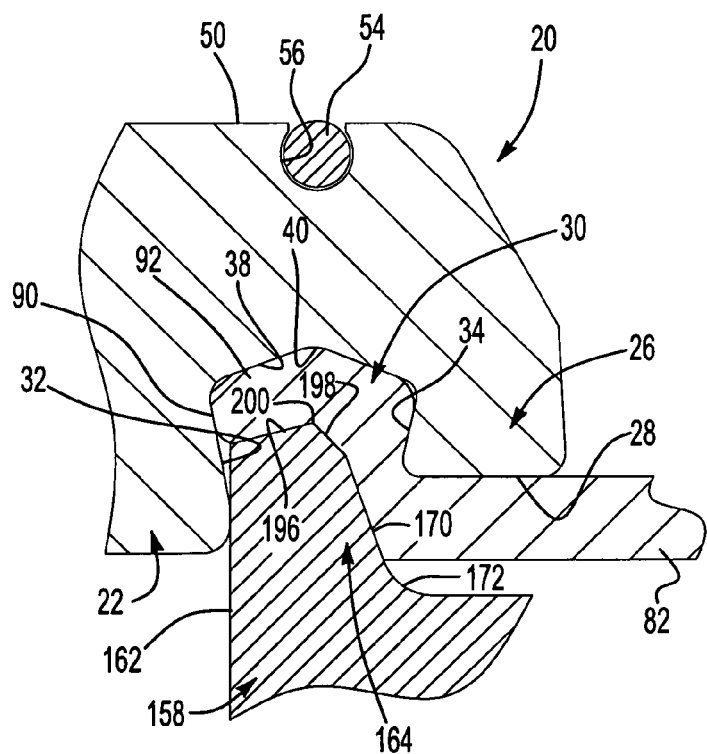
FIG. 11 is a side cross-sectional view similar to FIG. 10 with an alternative embodiment of the die button.

FIG. 11 is identical to FIG. 10, except that the clinching lips 164 of the die button 158 have a V-shaped end face including a first inclined end face 196 adjacent the opening 162 through the die button 158 or adjacent the inclined inner side wall 32 of the female fastener 20 during installation and a second inclined end face 198 adjacent the inclined outer side face 170 having an apex 200 aligned with the apex 40 of the relatively inclined bottom faces 38 as shown in FIG. 11. In a preferred embodiment, the first inclined end face 196 is longer than the second inclined end face 198 and inclined at a smaller angle than the second inclined end face 198, such that the apex 200 is aligned with the apex 40 of the bottom faces 38 of the groove. This embodiment of the die button 158 may be preferred with thinner panels to assure more substantial complete filling of the re-entrant grooves, preferably without fully packing the groove as described above with regard to FIG. 10. Thus, the numbering of the self-attaching female fastener 20 and panel 82 are identical to the previous figures and no further explanation is required.

As set forth above, the self-attaching female fastener and method of installation of this invention provide several important advantages over the prior pierce and clinch nuts of this type. First, the V-shaped bottom wall 36 of the re-entrant grooves 30 center the rolls and the wire in the rolling mill during rolling of the cross-section of the fastener 20, making it easier to roll and resulting in a more accurate cross-section. More importantly, the V-shaped bottom wall 36 of the reentrant grooves 30 balance the rolling forces, which has not been possible with a conventional re-entrant groove having a flat bottom wall. The V-shaped bottom wall 36 also centers the wire grooves 56 during rolling, resulting in more accurate location of the wire grooves. Further, because the re-entrant grooves are deeper than conventional re-entrant grooves having a flat bottom wall, the panel portions deformed into the grooves are better packed into the grooves with less thinning of the panel metal, resulting in a more secure installation than conventional self-attaching female fasteners of this type. Further the self-attaching female fastener of this invention having re-entrant grooves with a V-shaped bottom wall will accommodate a greater range of panel thicknesses, eliminating the requirement for different fasteners for a smaller range of panel thicknesses. For example, a typical self-attaching female fastener 20 of this invention as disclosed in the Figures can accommodate metal panels having a thickness of 0.70 to 2.5 mm with improved push-off strength. Finally, the self-attaching fastener of this invention has superior push-off strength at thicker panel metals above 1.5 mm. It is also believed that the improvements in push-off strength resulting from the use of a re-entrant groove with a V-shaped bottom wall will provide similar advantages for cold-formed fasteners having a generally round pilot and a flange portion surrounding the pilot, but the bottom wall should also include anti-rotation features, such as radial circumferentially spaced ribs.

As set forth above, various modifications may be made to the self-attaching female fastener and method of assembly of this invention within the purview of the appended claims. More specifically, the self-attaching female fastener of this invention may be formed by conventional cold-forming techniques, including progressive dies, wherein the female fastener is, for example, round or oval-shaped, rather than rectangular. In such embodiments, the pilot portion 22 could be round having an annular end face and the flange portion surrounds the pilot portion, wherein the groove in the end face is also annular. The self-attaching female fastener would then have only one annular re-entrant groove surrounding the pilot portion having a V-shaped bottom wall as described and shown in FIGS. 8 to 10. Of course, the projecting lip of the die member would also be annular and configured to be received in the re-entrant groove as described above. Further, the self-attaching female fastener of this invention may be utilized as a pierce nut as shown in FIG. 7 or the opening 90 through the panel may be preformed, wherein the self-attaching fastener is utilized as a clinch nut. Finally, the end face of the clinching lip may have various configurations which will be dependent in part upon the thickness of the panel metal, wherein the clinching lip or lips may have a V-shaped end face for thinner panel metals to assure filling of the re-entrant groove. Having described preferred embodiments of this invention, the invention is now claimed as follows.

We claim:

1. A self-attaching female fastener for attachment to a metal panel, said self-attaching female fastener comprising:
   a central pilot portion having an end face and a bore extending through said end face through said pilot portion;
   a flange portion on at least opposed sides of said pilot portion having a generally planar panel support face generally parallel to said end face of said pilot portion; and
   at least one groove in said panel support face of said flange portion adjacent said pilot portion, said at least one groove including an inclined inner side wall defining an outer face of said pilot portion, an inclined outer side wall and a V-shaped bottom wall, said inner side wall inclined outwardly from said bottom wall toward said flange portion and said outer side wall inclined inwardly from said bottom wall toward said pilot portion forming an opening of said at least one groove adjacent said panel support face having a width less than a width of said at least one groove at said bottom wall, and said V-shaped bottom wall having generally equal opposed relatively inclined bottom faces defining sides of an equilateral triangle having an apex extending away from a plane of said panel support face generally equally spaced between said inner and outer side walls of said at least one groove.

2. The self-attaching female fastener as defined in claim 1, wherein
said bottom faces of said V-shaped bottom wall are inclined relative to said generally planar panel support face at an angle of between 15 and 25 degrees.

3. The self-attaching female fastener as defined in claim 1, wherein said bore is internally threaded and said self-attaching female fastener includes a back face opposite said end face of said pilot portion having a recess surrounding said bore.

4. The self-attaching female fastener as defined in claim 1, wherein said apex is an arcuate surface.

5. The self-attaching female fastener as defined in claim 1, wherein
said flange portion is rectangular, including said panel support face on opposed sides of said pilot portion, and said at least one groove comprises linear grooves on opposed sides of said pilot portion, and said female fastener further includes a back face, opposite said panel support face of said flange portion, said back face of said fastener including semi-circular grooves adapted to receive frangible connector elements aligned with said apex of said V-shaped bottom wall.

6. The self-attaching female fastener as defined in claim 1, wherein said end face of said pilot portion is spaced above said panel support face of said flange portion, said pilot portion including an outer surface spaced above said panel support face extending generally perpendicular to said end face, said inner and outer side walls of said at least one groove inclined at an angle of between 10 and 20 degrees, and said opposed relatively inclined bottom faces of said V-shaped bottom wall are planar and inclined relative to said panel support face at an angle of between 10 and 15 degrees.

7. A self-attaching female fastener for attachment to a metal panel, said female fastener comprising:
 a central pilot portion having an end face and a bore extending through said end face and through said pilot portion;
 generally rectangular flange portions on opposed sides of said pilot portion each having a generally planar panel support face extending generally parallel to said end face of said pilot portion; and
 linear grooves on opposed sides of said pilot portion in said panel support faces of said flange portions, said grooves each having a generally planar inclined inner side wall defining outer faces of said pilot portion, a generally planar inclined outer side wall and a V-shaped bottom wall, said inner side wall inclined outwardly from said bottom wall toward said outer side wall, and said outer side wall inclined inwardly from said bottom wall toward said inner side wall; said panel support faces of said flange portions forming a restricted opening to each of said linear grooves; each said restricted opening having a width adjacent said panel support faces less than a width of said groove adjacent said V-shaped bottom wall, and said V-shaped bottom wall including relatively inclined bottom faces forming an apex extending away from said panel support faces of said flange portions.

8. The self-attaching female fastener as defined in claim 7, wherein said bottom faces of said V-shaped bottom wall are generally equal in width and said apex is generally equally spaced between said inclined inner and outer side walls of said grooves.

9. The self-attaching female fastener as defined in claim 7, wherein said self-attaching female fastener includes a back face opposite said panel support faces of said flange portion including semi-circular grooves adapted to receive frangible connector elements aligned with said apex.

10. The self-attaching female fastener as defined in claim 9, wherein said back face includes a recess surrounding said bore and said bore is internally threaded.

11. The self-attaching female fastener as defined in claim 7, wherein said bottom faces of said V-shaped bottom wall are inclined relative to said generally planar panel support faces at an angle of between 15 and 25 degrees.

12. The self-attaching female fastener as defined in claim 7, wherein said apex formed by said bottom faces of said V-shaped bottom wall is arcuate.

13. The self-attaching female fastener as defined in claim 12, wherein said apex formed by said bottom faces of said V-shaped bottom wall has a radius of about 0.05 inches or less.

* * * * *

UNITED STATES PATENT AND TRADEMARK OFFICE
CERTIFICATE OF CORRECTION

PATENT NO. : 6,997,659 B2  
APPLICATION NO. : 10/811658  
DATED : February 14, 2006  
INVENTOR(S) : John J. Vrana, Richard P. Ward and Harold A. Ladouceur It is certified that error appears in the above-identified patent and that said Letters Patent is hereby corrected as shown below:

Column 12, line 31, please insert "each" before --said apex--.

Column 12, line 34, please insert "each" before --said apex--.

Signed and Sealed this

Fourth Day of July, 2006

JON W. DUDAS  
*Director of the United States Patent and Trademark Office*